(12) United States Patent
Vial Maceratta

(10) Patent No.: US 12,245,099 B2
(45) Date of Patent: Mar. 4, 2025

(54) VALIDATE AN ACTIVATION OF AN APPLICATION ON A DRIVER'S SMARTPHONE

(71) Applicant: Pedro Vial Maceratta, Santiago (CL)

(72) Inventor: Pedro Vial Maceratta, Santiago (CL)

( * ) Notice: Subject to any disclaimer, the term of this patent is extended or adjusted under 35 U.S.C. 154(b) by 439 days.

(21) Appl. No.: 17/773,468

(22) PCT Filed: Sep. 24, 2020

(86) PCT No.: PCT/CL2020/000004
§ 371 (c)(1),
(2) Date: Apr. 29, 2022

(87) PCT Pub. No.: WO2022/061478
PCT Pub. Date: Mar. 31, 2022

(65) Prior Publication Data
US 2022/0377501 A1    Nov. 24, 2022

(51) Int. Cl.
*H04W 4/02* (2018.01)
*G01C 21/16* (2006.01)
*H04W 4/029* (2018.01)

(52) U.S. Cl.
CPC .......... *H04W 4/027* (2013.01); *G01C 21/165* (2013.01); *H04W 4/029* (2018.02)

(58) Field of Classification Search
CPC .................. B60W 50/14; H04M 1/724098
USPC ...................................... 455/456.1
See application file for complete search history.

(56) References Cited

U.S. PATENT DOCUMENTS

| | | | |
|---|---|---|---|
| 9,227,595 B2 | 1/2016 | Yang et al. | |
| 2013/0285855 A1 | 10/2013 | Dupray et al. | |
| 2015/0112504 A1* | 4/2015 | Binion | G07C 5/008 701/1 |
| 2015/0211846 A1 | 7/2015 | Suziki et al. | |
| 2015/0296371 A1* | 10/2015 | Kong | H04M 1/72463 455/419 |
| 2019/0389483 A1* | 12/2019 | Likhterman | B60W 50/0098 |

* cited by examiner

Primary Examiner — Fabricio R Murillo Garcia
(74) Attorney, Agent, or Firm — Bauer & Joseph

(57) ABSTRACT

Method for activating an application program, on a smartphone. This method forces the driver of a vehicle to activate and keep the application program activated while driving, since it is a telematic insurance for a vehicle that only has coverage while the smartphone is not used and a programmed speed limit is not exceeded. This method makes it difficult to activate immediately after a crash and requires a trip at a certain speed and for a time T, something very difficult in a crash scenario. It also keeps a record of the coordinates, time and date of activation and deactivation of the application program and this does not allow fraud to the insurer. This method makes it possible to ensure and prevent, without the two main causes of accidents, smartphone distraction and speeding.

3 Claims, 3 Drawing Sheets

VALIDATE AN ACTIVATION OF AN APPLICATION ON A DRIVER'S SMARTPHONE

CROSS REFERENCE TO RELATED APPLICATION

The present application is a U.S. national stage application of PCT International Application No. PCT/CL2020/000004, filed Sep. 24, 2020, and published as PCT Publication WO/2022/061478 on Mar. 31, 2022. The disclosures of all the foregoing applications are hereby incorporated by reference in their entirety into the present application.

DESCRIPTION

Method to validate the activation of an application program on a driver's smartphone through the detection of speed during a determined driving time.

TECHNICAL FIELD

The disclosure is directed to a method that validates the activation of an application program, which operates as a telematic insurance for a vehicle. The mission of this method is to make the activation of the telematics insurance very difficult for the driver to obtain, only after a crash or incident has occurred.

This method associates the detection of a certain speed, a certain detection time, notification of date, hour, internet, GPS coordinates of the activation request, activation validation, deactivation of the application program and speeding, during your activity.

The method is intended to oblige the use of the telematic insurance while driving and to prevent the insurance from being activated only after a crash or incident, to falsely demonstrate to the insurer the use of the insurance at the time of the crash or incident.

The method, which is executed while driving a vehicle, is based on the detection of a certain speed, for a certain time, after a request for activation of the application program, advancing a certain distance traveled before achieving a valid activation, which is also the activation of the telematics insurance. These displacement to obtain the activation of the application program, associated with an accident scenario, are incompatible.

This telematic insurance only covers while the driver has it activated and In the foreground of the smartphone. If the driver uses the smartphone while driving, or exceeds a certain speed, then he loses his insurance and this particular method of activating telematic insurance is designed to prevent the driver from activating it only after a crash has occurred. The driver must have it activated before the collision, as ordered by this insurance policy.

An insurance without the distraction of the smartphone and without speeding is much less risky and, therefore, very economical. Further, such a device has a large market, mainly among young drivers under eighteen, who in most of the United States of America are prohibited from using the phone smart and have expensive insurance.

BACKGROUND ART

According to the National Highway Traffic Safety Administration (NHTSA), currently more than 65% of accidents are caused by distracted driving.

A growing trend is the use of telematics in car insurance. Insurance companies have put their trust in telematic devices in the vehicle, to create plans based on monitored behavior (braking, acceleration, speed, mileage and driving time) and according to this data collected, added to the age, experience, history of driving, residence, etc. They say that these factors help to calculate more accurately the insurance premium of vehicles, but specialists say that this is 80% speculation and 0% decrease in risks.

Also known are some application software or Apps for smartphone that block chat while driving, and keep a ranking with speeding, but these Apps are for voluntary use and cannot be associated with real-time insurance, because the use It is not demonstrable or obvious, before and during an accident. Therefore, insurers only use the smartphone (Apps), to store behavioral data and as a replacement for telematic devices, but nothing in real time.

Some jurisdictions, such as California in the United States, have enacted laws, such as Proposition 103 (enacted in 1988), for the regulation of insurance. This requires insurers to define the rate of their vehicle insurance, based on the historical behavior and experience of the driver; Then the behavior is important.

A common pattern in vehicle insurance is discrimination based on age, experience, and driving history to calculate the price of the premium. However, this calculation is inefficient and sometimes unfair.

In fact, the method proposed to activate the application program and allows it to be used as a telematic insurance, which covers damages only while it is activated and no matter the history or age; based on a special activation, which is very difficult to execute after a crash, which is the main mission of this method and forces the driver to keep the application program activated while driving, as using the smartphone while driving cancels the insurance.

This obligation to use the device is encouraged because smartphone use, while driving, and speeding represent the main driving-related risk factors. Therefore, by eliminating these risks from driving, the insurance will be cheaper and its use will be in greater demand in the insurance market.

This method creates a transparent market for the insurer and the insured.

The validation of the activation of the application program, allows not to discriminate more in age or driving history and not only to pay compensation after the damage has occurred, but to voluntarily prevent the distraction of the smartphone during the driving, in exchange for remaining insured during the tour.

This method makes possible, for the first time, a vehicle insurance that eliminates risks to its policyholders and not only provides money for damages to health and life that many times compensation cannot return.

DISCLOSURE OF INVENTION

This method for the activation of the application program, is designed so that the activation is very difficult to execute after an accident and to create a trajectory during the activation, (using the GPS of the smartphone), which delivers the necessary information, to deduce after an accident, the effective moment of its use, before or after the accident.

This telematic insurance conditions the coverage to the activation or use of the application program, before and during an accident and to a notice of this incident, from the same place of occurrence to the insurer.

To achieve the validation of the activation of this application program, the method requires that the application program, during its activation, detect a determined speed, greater than zero mph and this detection is maintained or remain continuous for a determined time T, where T is a time interval.

The activation is very difficult to execute in an accident scenario (moving the vehicle, at a determined speed, for a determined time), but also, this is an obvious and simple task when driving begins, in a normal traffic scenario, between a point and another of the route.

For this reason, this application program can be used as a platform for telematic insurance, based on use, characterized by being activatable at will.

This method is developed as follows:

A driver and a smartphone are described in a vehicle that can travel with speed, greater than zero mph.

Once this application program for monitoring a driver is installed on the smartphone and the driver requests its activation or brings it to the foreground, then there is a method, inherent to follow to validate the activation of this application program.

By executing the activation method, a platform is configured that can be used as an activatable telematic insurance.

At the time of the activation request, the application program generates a notification, with the exact GPS position, time and date of the activation request of the application program and sends it to a remote administrator, to the messaging system from the smartphone and the driver's email.

Executed this request on the smartphone, the application program works in the foreground of the smartphone's system and its interface is presented on the smartphone screen and requires the activation of the GPS of the smartphone, to make it possible to detect a determined speed greater than zero mph.

Once the GPS is activated, the activation method require that the smartphone detect, by means of the component, a minimum travel speed, equal to or greater than a minimum speed limit, as a fundamental part of this method for activation validation of this application program.

This minimum speed is called the activation speed and must be greater than zero mph.

The driver carrying the smartphone must travel at a speed greater than zero mph and subject the smartphone to that minimum speed condition, as part of the method.

Then, the speed is detected by means of the GPS of the smartphone and managed by the activation method of the application program.

Consecutively to the speed detection greater than zero mph, the activation method of the application program, instantly orders the start of a countdown, which must be executed for a time T. This time T is called the activation time and is limited.

During this time T, the speed (uniform, accelerated or decelerated) of displacement must be greater than or equal to the magnitude of the speed (minimum limit), as part of the activation method and must be detected continuously, from the beginning until the end of time T of the countdown.

Consecutively when the time T of the countdown ends, the method verifies the activation of the application.

At the same time, the application program generates a notification, with the exact GPS position, hour and date of the validation of the activation of the application program and sends it to a remote administrator, the messaging system of the smartphone and the driver email.

Then the method requires keeping the application program in the foreground, otherwise the method for activating the application program must be repeated.

At the moment that the activation of this application program is validated, by means of the method, the application program, consecutively continues its supervision routine, composed of functionalities that limit the use of the smartphone and monitor the speed, during the tour.

When the application program for monitoring a vehicle driver exits from running in the foreground of the smartphone system, the application program is deactivated.

Each time the application program is deactivated, moments before, the same application program sends a notification, to the available messaging system, to the remote administrator, to the SMS of the smartphone and to the driver's email, with the position GPS, date and time of deactivation.

The application program is deactivated when a certain programmed limit speed is exceeded and it is necessary to decrease the speed up to the exceeded limit and maintain the speed (constant, accelerated or decelerated) between the limit and the minimum activation speed during the time T before mentioned, so that the program is automatically activated again.

BRIEF DESCRIPTION OF THE DRAWINGS

The present invention will be understood and appreciated more fully from the following detailed description, taken in conjunction with the drawings in which.

DESCRIPTION OF THE PREFERRED EMBODIMENTS

Figure 1:
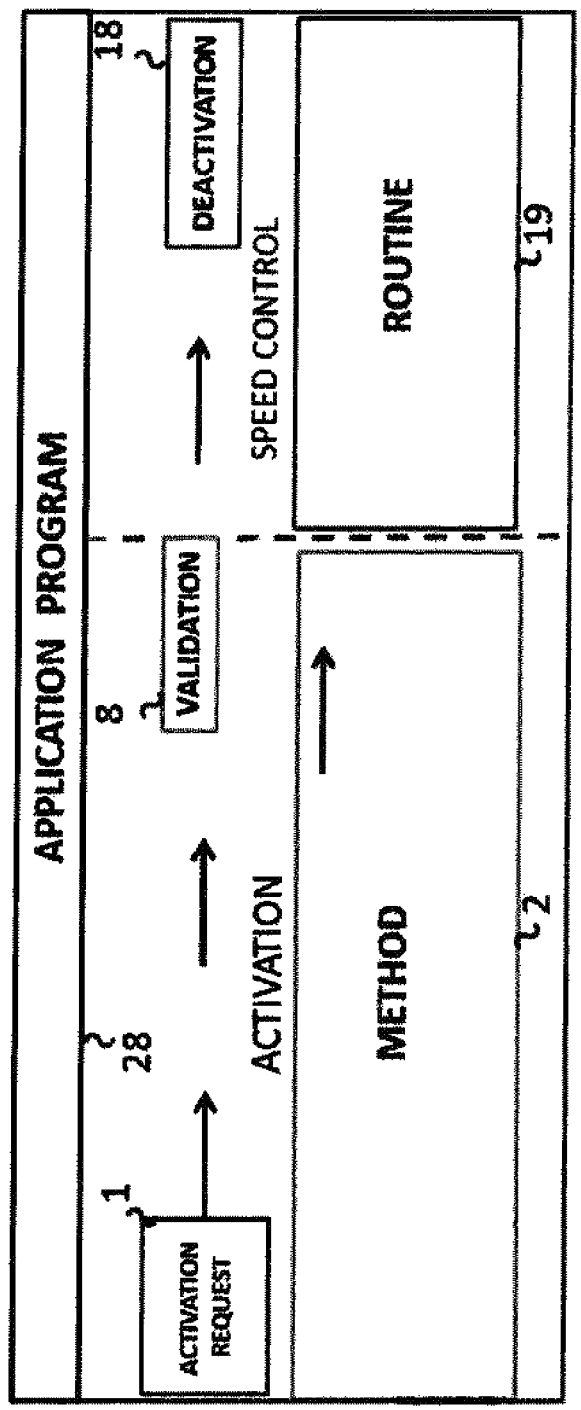
FIG. 1 is a diagram of the direction of the activity flow and the basic architecture of the application program installed in a smartphone for the monitoring of a driver, where the method for the validation of its activation precedes its speed control functionality.
Figure 2:
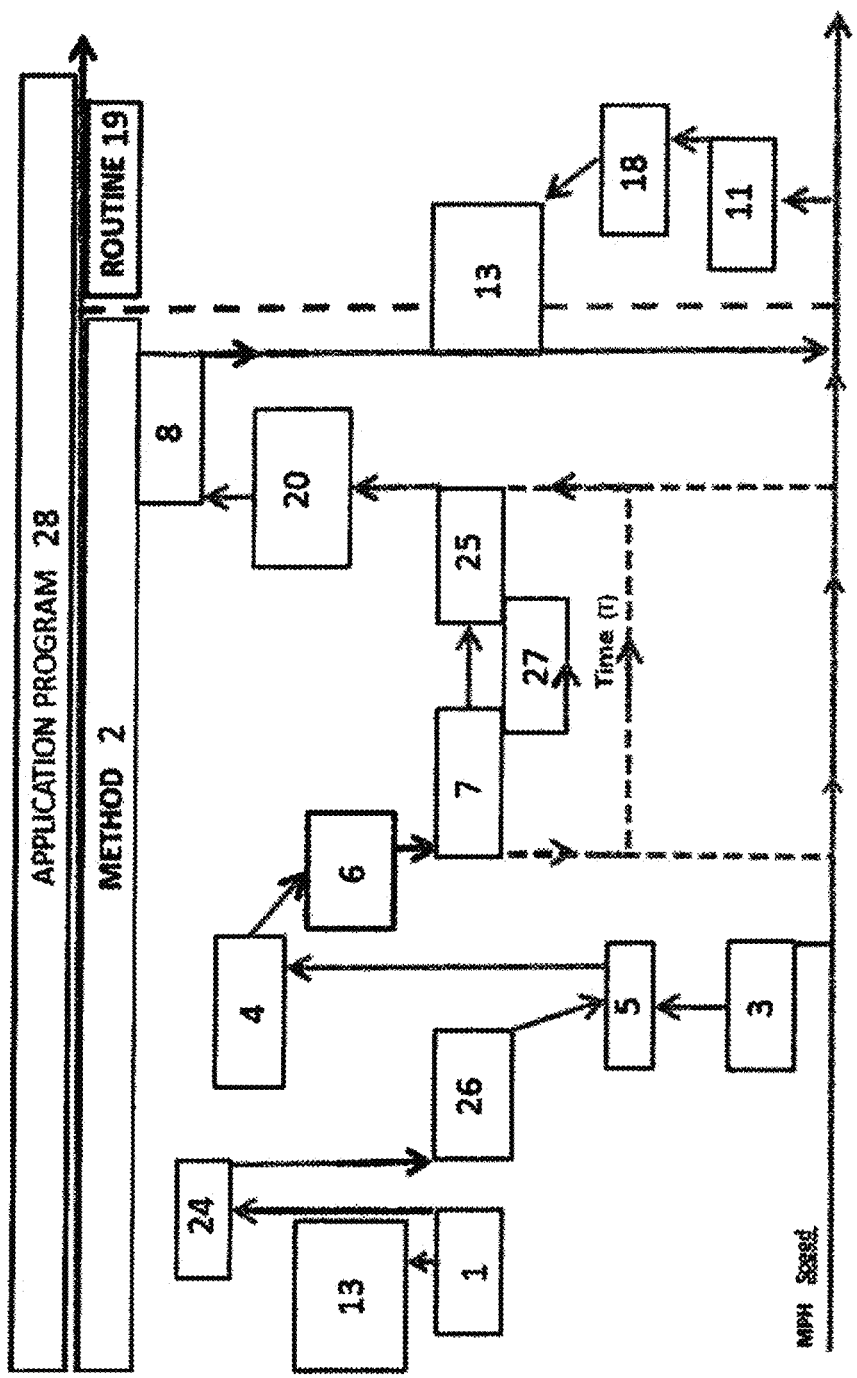
FIG. 2 is a flow chart showing the basic functionality and priority of the data within that application.
Figure 5:
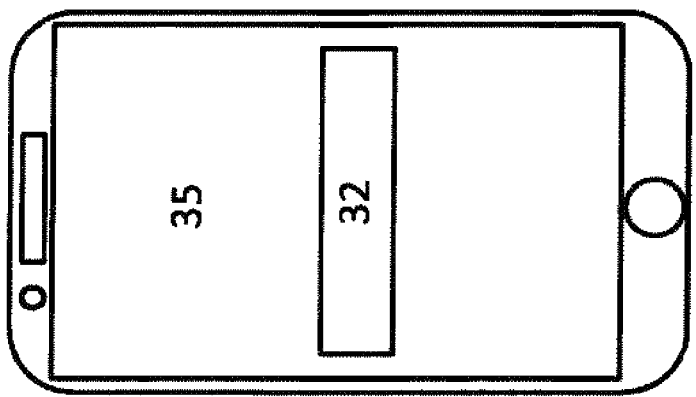
FIG. 5 is a graphical representation of the third user interface, of the smartphone, which contains a speedometer and indicates the colors red or orange, that it should have, as background screen color.

The present disclosure will be described with respect to a particular embodiment and with reference to the referred drawings.

An application program 28 is described for a driver's smartphone, consisting of a particular method 2 for the validation of its activation and further comprising a routine 19, which is also a method for speed control while driving.

The method and routine will be referred to as method 2 and routine 19, to differentiate them, because they operate consecutively within the same application program 28.

The application program 28 must always be activated after the steps required and included in method 2 and must be deactivated when the application program 28 is removed from the foreground of the operating system and smartphone interface and is also automatically deactivated when the program application 28 operates during the routine 19 and detects, through the GPS associated with its functionality, the exceeding of a certain speed limit.

The method 2 is based on the validation of the activation of the application program 28, for which the platform for establishing the application program 28 must be provided on a remote server.

The platform must be accessed by means of a personal computer and I or smartphone, connected to the remote server through an internet connection and which contains an internet browser to govern the application program 28 and define the parameters that substantiate its function.

It is a method 2 to validate the activation of an application program 28 for the monitoring of a driver, while driving and that is installed in a smartphone that carries this driver.

The method 2 is presented as an initial part of the application program 28 which, allows to solve the validation of the activation of the application program 28, as a specific task, on a smartphone. This means a set of consecutive stages or steps that must be fulfilled, from when activation 1 of the application program 28 Is requested FIG. 3, until the activation 8 is validated FIG. 4, then the application program 28, from that moment operates as a telematic insurance, until its deactivation or loss of activation 18, voluntary or due to speeding.

The application program 28 within its total operating time, from the moment it is requested to be activated 1, until its deactivation 18, consists of three fundamental consecutive moments that must be identified in the following order, by its exact geospatial location, using coordinates, date and time of occurrence and these three moments are: when activation is requested 1, when activation is validated 8, and when it is deactivated or lose validation 18, according to FIG. 1.

The smartphone refers to a mobile device or mobile phone, which has an operating system, can be used as a computer, is connected to the internet and has at least among its basic components, a global positioning system or GPS 5, a camera, a Touch screen and an accelerometer among others.

The activation of the application program 28 needs to be validated by the method 2 before it is complete.

The method 2 always precedes routine 19, within application program 28.

The smartphone governs a plurality of components and functionalities that allow the total development of the application program 28 by means of the method 2 and its inherent routine 19, which is another method inserted in the application program 28, during which the exceeding of a determined speed limit is controlled.

The method 2 for the valid activation of the application program 28 and its execution associated with the GPS 5 of the smartphone, for the detection of a minimum speed (minimum limit), greater than zero mph.

Simultaneously with this detection, the method 2 activates a countdown 27 with a duration of time T, greater than zero seconds, during which the detection of speed equal to or greater than the minimum limit 3, is associated with this time T, resulting in a path, executed by the vehicle carrying the smartphone during this time interval T.

The time T refers to a determined time.

The method 2 configures, through this mandatory trajectory, the validation of the activation of the application program 28 and allows its functionality to be used as an activatable telematic insurance, for the monitoring and coverage of a driver in real time, which conditions the insurance coverage, to the use and the activation, before an accident and a notice of the accident, from the same place of occurrence to the insurer.

The activation according to the method 2 is evidence of the trajectory with the application program 28 (application) activated on the smartphone, before the accident, because after the accident it is very difficult to obtain this (mandatory) trajectory and replicate the scenario (if it came or was disabled).

The operation according to a preferred embodiment of the method 2, which interacts with the routine or method 19 of the application program 28, for the supervision of a driver and once already downloaded and installed on the driver's smartphone, is as follows:

From the moment that a driver who drives a vehicle requests the activation 1 or opening of the application program 28, in the screen menu of the smartphone that it carries, then the application program 28 is executed in the foreground 24 of the operating system of the smartphone.

Figure 3:
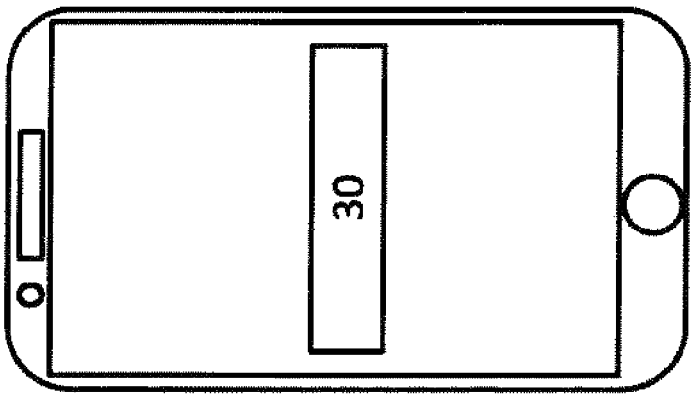
FIG. 3 is a graphical representation of the first user interface, of the smartphone, indicating the start of driving.

Then the application program 28, before showing the first user interface to start driving FIG. 3, shows three consecutive initialization interfaces, one with a corporate logo, another with space to write the email and personal password and another user interface with a request to the driver for the necessary activation 26 of GPS 5, of the smartphone and the application program 28 and the method 2, receives signal from the GPS 5 and confirms the activation on the screen of the smartphone.

Then the first user interface FIG. 3 indicating the start of driving 30 is shown on the screen of the smartphone.

Then method 2 generates a notification 13 with the coordinates and a map of the exact position of the smartphone, indicated by the GPS, time and date of the moment of the activation request 1.

The notification 13 is then sent to the remote administrator of the application program 28, to the driver's own smartphone, which has the application program 28 installed, to his email and messaging system, characteristic of the smartphone and social networks, installed on the smartphone, as a record of activation request 1, of the application program 28.

This notification 13 is generated and sent in this way, each time the activation of the application program 28 is requested manually or automatically, each time the requested activation 8 is validated and each time it is manually or automatically deactivated 18 due to excess speed, as explained later.

Then, method 2 for the validation of the activation of the application program 28, requires detect without interruption 4 a programmable speed v greater than zero mph, whether this is a constant speed, accelerated or decelerated, but equal to or greater than a programmed speed limit 3, as the minimum detectable limit.

The minimum detectable speed limit 3 it is programmable from the remote administrator.

The detection 4 is executed, based on the data collected from the GPS 5 and its functional capacity associated with the method 2.

The detected tour speed can be constant, accelerated or decelerated, but always greater than or equal to the programmed speed 3 as the minimum limit.

Simultaneously it is required that the speed detection 4, order 6 the start 7 without interruption, of a determined time T in countdown, also programmable from the remote administrator.

Then, the speed detection 4 is required to be executed without interruption, during the time T.

This implies, transporting the smartphone at a constant speed, accelerated or decelerated, but always greater than or equal to the minimum speed 3, continuously, without interruption and not less than this, for a determined time T of uninterrupted counting down.

The countdown time Tis programmable and its amount may vary.

Then, this method 2 for the valid activation of the application program 28 requires the uninterrupted detection of an uninterrupted speed 4 greater than or equal to a determined minimum limit 3, for an uninterrupted time T in countdown 27, all this simultaneously and until the end of time T.

Figure 4:
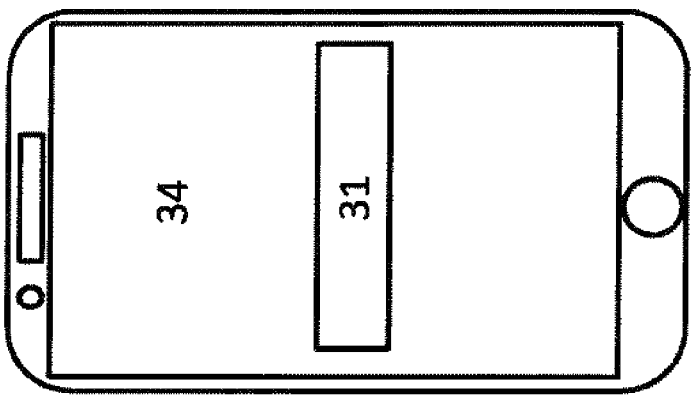
FIG. 4 is a graphical representation of the second user interface, of the smartphone, which contains a speedometer and indicates the black color it should have, as the background screen color.

Then, after the countdown has finished 25, the method 2 verifies the end 20 of the time T and orders the validation of activation 8 of the application program 28 and an second activation user interface FIG. 4 is displayed, with a speedometer 31 and with black background screen color 34 of the smartphone, for lower power consumption, during the tour, compared to the first opening interface, according to the method 2.

Next, the method 2, orders consecutively generate a notification 13, with the coordinates and a map of the exact location of the smartphone, at the moment of activation 8, indicated by the GPS 5.

The notification also includes the time and date of the moment of the activation 8.

The notification 13 is sent in that moment to the remote administrator of the application program 28, to the same smartphone as the driver that has the application program 28 installed, to your email and messaging system, typical of the smartphone and social networks, installed on the smartphone, as a record of the valid activation 8 of the application program 28 and executed according to the indications of method 2.

With this notification 13, method 2 of application program activation 28 is terminated and gives way to the routine 19.

Every time the application program 28 loses the activation validation 18, the activation validation method 2 becomes invalid again and its execution must be repeated again, to validate the method 2 again and it also means validating activation 8 again.

Every time the method 2 is validated or loses validity, the application program 28 must generate a notification 13 with the coordinates of the exact position, time and date of the deactivation and the notification 13 must be sent from the same way as the previously described notifications 13.

Once the application program 28 validates activation 8, by means of the method 2, it 28, is developed by means of the routine 19 for the control of the maximum speed limit, detected by the GPS 5.

After the activation validation 8, the application program 28 must remain in the foreground 24 of the smartphone operating system, without interruption, in order to remain activated.

If the application program 28 is removed from the foreground 24, after activation validation 8 is obtained, the application program 28 it loses the activation validation 18 and it is necessary to repeat the method 2 to validate the activation again.

Every time the application program 28 loses the activation validation 8, it generates a notification with the coordinates and a map of the exact location of the smartphone, at the moment of the loss, including the date and time of the loss.

The notification is then sent to the server that remotely administers the application program 28, to the driver's own smartphone, which has the application program 28 installed, to his email and messaging system, characteristic of the smartphone and social networks, installed on the smartphone, as a record of the loss of activation validation of the application program 28.

During routine 19, which is developed after method 2 orders the validation of activation 8, the notification 13 and the method ends, a determined maximum speed limit 11 must not be exceeded to maintain the validation of activation 8 of the application program 28.

The maximum speed limit 11, is programmable and may vary. When the detected speed is higher than the speed limit 11, the application program 28 loses validation of its activation 18 automatically, and a third user interface FIGS. is displayed, with a speedometer 32 and with red or orange background screen color 35, in the smartphone, to warn of speeding and cancellation of the insurance, until not returning to the allowed speed and executing method 2 again.

In this case, the application program 28 is not removed from the foreground of operating system of the smartphone and the method 2 is invalidated and must be repeated, to validate the activation 8 of the application program again 28, as explained below for this case.

If the maximum speed limit 11 is exceeded and this application program 28 loses the activation validation 18, then this application program 28 will validate the activation or method 2 again and automatically when the detected speed decreases and then remains within the range limited by the minimum speed 3 and the maximum speed limit, 11, during the aforementioned time T, when the first user interface is redisplayed.

Any loss of activation validation 18 of the application program 28 implies having to repeat the method 2 again to obtain validation of activation 8 of this application program 28 again.

The method or sub-routine 19, complements the described functions, with a plurality of functions for the monitoring and supervision of a driver.

So, to lose the activation validation voluntarily or close the application program 28, it is enough to remove it from its execution from the foreground of the smartphone operating system and take it to the background or close the user interface or turn off the smartphone.

In more detail, also the application program 28 loses the validation of the activation 18, when a determined maximum speed limit 11 is exceeded and it is necessary to decrease the speed, up to the limit 11 previously exceeded and maintain the speed (constant, accelerated or decelerated) between the limit 11 and the minimum speed 3, during the time T, so that the application program 28 automatically validates the activation again, according to the method 2 for the validation of the activation of the application program 28.

Every time the application program 28 loses the validation of activation 18, voluntarily or due to speeding, it generates a notification 13, with the coordinates of the exact location according to GPS 5, time and date of the moment of the loss and it sends it to the server that remotely administers the application program 28, to the driver's email and SMS on the smartphone and to their social networks and optionally to any available notification system.

The invention claimed is:
1. A method to validate the activation of an application program on a driver's smartphone, through detection a speed during a time determined driving, the method comprising:
receiving an activation request for said application program, on the driver's smartphone;

executing said application program in a foreground of an operating system of said driver's smartphone;

showing in a first user interface a request for a necessary activation of a Global Positioning System (GPS);

receiving an activation signal from the GPS of said driver's smartphone;

confirming the necessary activation of said GPS on a screen of said driver's smartphone;

showing the first user interface indicating a start of driving;

generating a first notification with a set of coordinates and a first map of an exact position of said driver's smartphone, indicated by said GPS, hour and date of a moment of said activation request;

sending consecutively said first notification to a remote administrator of the application program, to said driver's smartphone, to said driver's smartphone email messaging system and to social networks installed on said driver's smartphone;

detecting, without interruption, a speed greater than zero mph and equal to or greater than a programmed minimum speed limit, as a minimum detectable limit; start a countdown or countdown without interruption, with a duration of time T, which runs simultaneously with said uninterrupted detection of said speed, until the end of said time T;

ending the countdown with the duration time T;

verifying an end of said time T in said countdown;

ordering a validation of the activation of the application program;

showing a second activation user interface, with a first speedometer and with black background screen color;

generating a second notification with the set of coordinates and a second map of the exact position of said driver's smartphone, indicated by said GPS, time and date of a moment of said activation validation; and sending consecutively said second notification to the remote administrator of the application program, to said driver's smartphone, to said driver's smartphone email messaging system and to said social networks installed on said driver's smartphone.

2. The method of claim 1, further comprising:

executing said method, again, every time said application program loses a validation of its activation;

generating a third notification with the set of coordinates and a third map of the exact position of said driver's smartphone, indicated by said GPS, time and date of the moment of said activation validation; and sending consecutively said third notification to the remote administrator of the application program, to said driver's smartphone, to said driver's smartphone email messaging system and to said social networks installed on said driver's smartphone.

3. The method according to claim 1, in which once finished, a routine for controlling a maximum speed limit is developed, which comprises:

invalidating automatically the activation of said application program when the detected speed is higher than a determined maximum speed limit;

showing third user interface with a second speedometer and with red or orange background screen color; and not removing the application program from the foreground of the operating system of said driver's smartphone.

* * * * *